(No Model.)
R. M. HUNTER.
ELECTRICALLY PROPELLED VEHICLE.
No. 441,565. Patented Nov. 25, 1890.
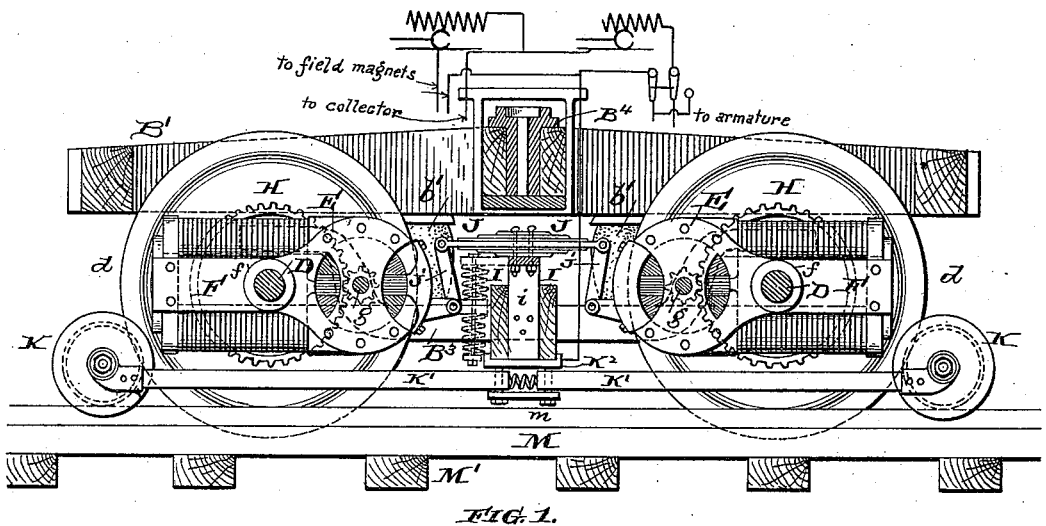
FIG. 1.
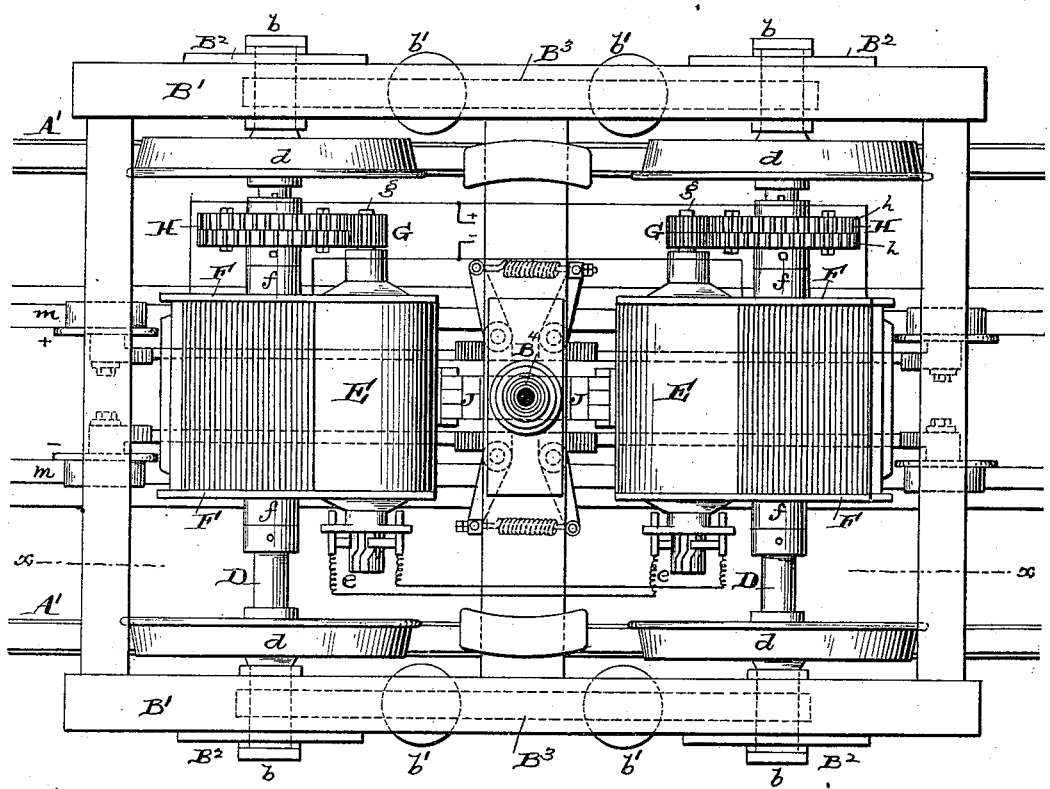
Witnesses: FIG. 2. Inventor:

UNITED STATES PATENT OFFICE.

RUDOLPH M. HUNTER, OF PHILADELPHIA, PENNSYLVANIA, ASSIGNOR TO THE ELECTRIC CAR COMPANY OF AMERICA, OF SAME PLACE.

ELECTRICALLY-PROPELLED VEHICLE.

SPECIFICATION forming part of Letters Patent No. 441,565, dated November 25, 1890.

Original application filed October 26, 1886, Serial No. 217,346. Divided and this application filed September 1, 1890. Serial No. 363,637. (No model.)

*To all whom it may concern:*

Be it known that I, RUDOLPH M. HUNTER, of the city and county of Philadelphia, and State of Pennsylvania, have invented an Improvement in Electrically - Propelled Vehicles, of which the following is a specification.

My invention has reference to electrically-propelled vehicles; and it consists of certain improvements, which are fully set forth in the following specification and shown in the accompanying drawings, which form a part thereof.

This application (Case 163) is a division of my application, Serial No. 217,346, filed October 26, 1886.

My invention has especial reference to electrically-propelled vehicles, whether they be in a form of pivoted trucks or made integral with the superstructure.

The essential feature of the invention set out and claimed in this application is the combination, with a car and its axles, of two electric motors, each of which is supported upon one side from a separate axle, the other side of said motors being supported by a yielding support connecting with a frame carried upon the axles independent of the vehicle-body and arranged beneath or at a lower level than the motors.

Referring more particularly to the construction shown, I employ the following arrangement of parts, to wit: To the axle or axles of the vehicle I journal one or more electric motors, which have their journals so located that they are preferably balanced upon said axles. By this means the motor-shaft is allowed to move in an arc about the axle, and is connected thereto by suitable gearing or power-transmitting devices. To prevent free rotation of the motor it is supported by a spring device to the vehicle or truck frame, and this enables the first power of the motor in starting to be expended in putting the spring under tension and provides an elastic connection between the motor and axle, facilitating the starting of the vehicle into motion from a state of rest. I do not limit myself to any particular form of elastic connection, as the specific constructions are capable of much modification. Such a connection of motor may be applied to a car or vehicle having axles connected to the car-body, as in the case of ordinary street-cars, or to a car having pivoted trucks, the difference being simply the connection of the car-body with the axles and not modifying the arrangement of the motor with respect to the axles or its method of support.

As shown in this application, I prefer to use two motors, one on each axle and facing each other. The free ends of the motors may be connected to the opposite ends of the same supporting-spring.

In the drawings, Figure 1 is a sectional elevation of my improved electrically-propelled vehicle taken on line $x$ $x$ of Fig. 2, and Fig. 2 is a plan view of same.

A' are the rails of a railway.

M' represent cross-ties, and M are longitudinal stringers, which may support the line-conductors $m$, if line-conductors are employed as a source of electrical power.

It is immaterial to my invention in this application what the source of power may be, as the current may be supplied from batteries carried by or moving with the cars or line-conductors, as desired.

The construction shown in the drawings is such that the car-body of the vehicle may be directly supported upon the frame of the truck and wholly sustained by two axles and four wheels, or the car-body may be pivoted to two trucks constructed substantially as illustrated. In either case what is here shown may be termed a "truck for a car-body." The truck proper may be made in any of the well-known ways. That shown consists of the frame B', provided with the usual side guides B² for the axle-boxes $b$, in which the axles D are journaled. $d$ are the car-wheels. Supported by the axle-boxes B³ independently of the frame B' are the equalizing-bars or side frames B³, between which and the frame B' are arranged the springs $b'$, which, in the construction shown, are the only spring devices used between the truck-frame and axles. It is evident that the particular location of these springs $b'$ between the axle-boxes and frame B' is immaterial. By the construction shown I am enabled to have the middle part of the truck free or unobstructed and for the disposal of the electrical connections or apparatus. B⁴ is the pivot-plate for connection with the car-body. A truck may be pivoted at each end of the car-body, if desired, in which case it would be like any ordinary car having eight wheels. Again, I may consider the frame B' as the vehicle-frame and as a complete vehicle, as it would be if the usual box or body were built upon it like an ordinary street-car.

E E are the electric motors and have the well-known horseshoe field-magnets. To each side of these magnets and their pole-pieces are secured brackets or frames F, having journals or bearings $f$, which fit upon the axles D, and by which the motors are supported upon the said axles. These bearings or journals are on each side of the motor and considerably separated. The axles may pass between the field-magnets. By this construction the motor-shafts $g$ are caused to remain at a fixed distance from the axles irrespective of the movement of the motor about said axles, and the yokes or keepers of the magnets of the motors are situated parallel with and in close proximity to the driving-axles. To the ends of the motor or drive shafts are secured the pinions G, which preferably have considerable width. Meshing with these pinions and secured to the axles are spur-wheels H. These spur-wheels are made in two parts $h\ h$, or as if divided through the plane of the wheel, and said parts are secured together by bolts and nuts $h'$. One of these parts $h$ of each wheel H is rigidly keyed or otherwise secured to the axle, while the other part is adjustable thereon and bolted to the fixed part $h$ at some distance from the axle to make the connection more secure. By adjusting these two parts the teeth thereof may be made to work smoothly between the teeth of the pinion G and all lost motion be taken up. While the above is an excellent connection between motor-shaft and axle, any other well-known form of power-connection may be used in place of it. The motor-shafts are provided with the usual commutators and brushes $e$.

To prevent the free revolution of the motors about the axles, I connect them by links J' with the free end of a two-armed spring J, which is carried by a cross-frame $i$, secured to the equalizing frames or bars B³. For simplicity and to cause the strains on the two ends of the spring J to be in the same direction at the same time the motors are arranged to face each other. This enables the adoption of a cheap and effective construction. It is to be understood, however, that I do not limit myself to any particular elastic supporting connection for the motor, as my invention comprehends the elastic connection broadly. A coil or other form of spring (shown in dotted lines at I') could easily be adapted to this construction in place of the flat plate-spring. Now as the motors start up, the first tendency to revolution of the armatures will be to oscillate the motors and put the springs J under tension. As the resistance of the springs is gradually increased, the tendency to rotate the axle also gradually increases, and by this connection the effective power of the motor on starting is greatly increased. The spring J acts the same when the motor is run forward or backward.

I are cross-frames supported to the frame $i$ or equalizing-bars, or both, and are preferably arranged below the spring J. To these frames I are secured the collector-supporting plates K², to which the collector-arms K' are loosely hinged with freedom to movement at their free ends. To the free ends of these arms K' are loosely journaled the collector-wheels K. Any other form of collector may be employed if line-conductors are employed, or the source of power may be batteries carried by or moving with the vehicle. So far as my invention in this application is concerned, it is immaterial what source of electrical power may be employed.

The cross-bars I and equalizing-bars B³ constitute a frame carried upon the axles, and said frame acts as the support for the springs connecting with the electric motors, and is practically at a lower level than the motors and extends transversely across the vehicle below the springs which support the motors.

I do not limit myself to any particular details of construction, as they may be modified in various ways without in the least departing from the principles of my invention.

Having now described my invention, what I claim as new, and desire to secure by Letters Patent, is—

1. In an electrically-propelled vehicle, the combination of two axles, a motor hinged to each of said axles, power-transmitting connections between the motor-shafts and the axles, a double-armed spring secured to the vehicle-frame, and a connection between the motors and the free ends of the spring.

2. In an electrically-propelled vehicle, the combination of the two axles, a motor hinged to each of said axles and having their field-magnets pointing in opposite directions, power-transmitting connections between the motor-shafts and the axles, a double-armed spring secured to the vehicle-frame, and a connection between the adjacent ends of the motors and the free ends of the spring.

3. The combination, with a car, of axles, two electric motors, each of which is supported upon one side from a separate axle, a frame supported from said axles and extending beneath the said motors, and a yielding support from said frame with the motors at the other sides thereof.

4. In an electrically-propelled car, the combination of a frame supported on the axles by means of springs for sustaining the superstructure of the car, separate electric motors journaled upon the respective axles, a frame connecting the axles at the sides and provided with a transverse portion extending across between the wheels and at a lower elevation than the motors, and a connection between the free ends of the motors and said transverse portion.

5. In an electrically-propelled car, the combination of a frame supported on the axles by means of springs for sustaining the superstructure of the car, separate electric motors journaled upon the respective axles, a frame connecting the axles and provided with a transverse portion extending across the wheels and at a lower elevation than the motors, and a separate spring-connection between the free ends of each of the motors and the said transverse frame.

6. In an electric car, the two axles, in combination with separate motors journaled upon the respective axles and having their shafts arranged nearer together and in the space between the two axles and parallel to said axles, a frame supported upon the axles independent of the vehicle-body or main frame and at a lower level than the shafts of the motors, power-transmitting gearing between the motor-shafts and the respective axles, and an elastic connection between the free ends of the motor and the frame supported on the axles.

In testimony of which invention I have hereunto set my hand.

R. M. HUNTER.

Witnesses:
    ERNEST HOWARD HUNTER,
    A. J. DUNN.